United States Patent [19]

Audeh et al.

[11] 4,120,782
[45] Oct. 17, 1978

[54] METHOD FOR IMPROVING THE TREATING CAPACITY OF A CLAY SORBENT

[75] Inventors: Costandi A. Audeh, Princeton, N.J.; Tsoung-Yuan Yan, Philadelphia, Pa.

[73] Assignee: Mobil Oil Corporation, New York, N.Y.

[21] Appl. No.: 866,747

[22] Filed: Jan. 3, 1978

[51] Int. Cl.$^2$ ............................................. C10G 25/12
[52] U.S. Cl. ..................................... 208/305; 208/303
[58] Field of Search ....................... 208/305, 302, 303; 252/415

[56] References Cited

U.S. PATENT DOCUMENTS

| 2,785,139 | 3/1957 | Heinemann | 252/415 |
| 2,977,323 | 3/1961 | Johnson et al. | 252/415 |
| 2,992,189 | 7/1961 | Friedman et al. | 252/415 |
| 3,318,820 | 5/1967 | Muller et al. | 252/415 |
| 3,427,254 | 2/1969 | Muller et al. | 252/415 |

Primary Examiner—George Crasanakis
Attorney, Agent, or Firm—Charles A. Huggett; Raymond W. Barclay; Howard M. Flournoy

[57] ABSTRACT

The treating capacity of a finishing unit for oils of lubricating viscosity is increased and the quality of oil treated therein is improved in a process comprising contacting regenerated clay adsorbent from said finishing unit with anhydrous acid gas prior to returning it to the adsorbent bed of said unit, and thereafter contacting said oil with said acid gas treated adsorbent.

10 Claims, No Drawings

METHOD FOR IMPROVING THE TREATING CAPACITY OF A CLAY SORBENT

BACKGROUND OF THE INVENTION

1. Field of the Invention

This application is directed to a process for increasing the treating capacity of an adsorbent bed of a finishing unit for oils of lubricant viscosity and for improving the quality of the oil treated therein.

2. Description of the Prior Art

It is known to selectively sorb compounds of low polarity from mixtures with compounds of the same or greater polarity by using a crystalline alumino-silicate; U.S. Pat. No. 3,732,326. Anhydrous acidic zeolite aluminosilicates (containing cerium ions) are known to be useful as catalysts in the alkylation of isoparaffins with olefins; British Pat. No. 1,209,942.

Further, acid resistant, heat resistant molecular sieves prepared from volcanic tuff are claimed to be useful for removing low molecular weight contaminants, such as carbon dioxide and ammonia from organic substances, E. Gaeroeg et al. (Inst. High Pressure Res., Budapest) *Brenn st. Chem.* 50 No. 8: T 59 (August, 1969). Also acidic impurities are claimed to be selectively adsorbed from a gas stream with an activated zeolitic molecular sieve having adsorbed ammonia; the impurity may be $CO_2$, $CS_2$, $H_2S$, $NO_2$ or $C_1$-$C_5$ alkylmercaptans; Belgium Pat. No. 729, 768-69. Treating liquid hydrocarbons by percolating them through clay is also known.

Lubricating oil base stocks, especially turbine oils contain compounds with heteroatoms such as nitrogen and sulfur. The presence of small amounts of sulfur compounds in such hydrocarbons tends to be desirable. However, compounds containing nitrogen and other organic or polar moieties are usually not desirable. Therefore, a process which removes such undesirable compounds from various hydrocarbon feedstock, e.g., hydrocarbon oils of lubricating viscosity is highly desirable.

SUMMARY OF THE INVENTION

This application is directed to a novel process for increasing the capacity of a solid sorbent in a finishing unit for oils of lubricating viscosity and for effecting the removal of undesirable organo-polar compounds from lubricating oils in contact therewith comprising continuously removing sorbent from said finishing unit, contacting it with anhydrous acid gas until an effective amount of said gas is adsorbed therein and returning the sorbent to the finishing unit and thereafter contacting said oil and sorbent under removal conditions at an appropriate temperature and pressure until substantially all of said undesirable compounds are removed from the oil thereby improving the quality of said oil and wherein the solid sorbent is a particulate clay.

Clay finishing of refined products involves the use of an adsorbent for contacting the desired product so as to remove color bodies, oxygen compounds, nitrogen compounds and other undesirable components. Usually the capacity of such adsorbents via prior art methods is limited and small volumes of oil are treated per volume of adsorbent. For example, in clay finishing of turbine oils, not more than 12 volumes of oil per volume of clay can be processed. In fact, usually 3 volumes of oil are contacted with one volume of clay followed by a clay regeneration cycle and the addition of 8-10% of fresh clay as make-up. Clearly, as practiced by the prior art, clay percolation is a costly procedure which depends on adsorbent regeneration and make-up to maintain usefulness. Our method extends the life of the adsorbent between cycles. Up to 20 volumes or more of oil may be processed in accordance with this invention prior to regeneration.

DESCRIPTION OF SPECIFIC EMBODIMENTS

The novel process in accordance with this invention is particularly useful with respect to petroleum oils of lubricating viscosity. Nevertheless, distillate fuel oils and similar light hydrocarbon products including mineral oil and synthetic products may be similarly treated.

Suitable sorbents include material such as bauxite, alumina, silica-alumina, silica-magnesia, silica-zirconia, silica-thoria, silica-berylia, silica-titania as well as ternary compositions, such as silica-alumina-thoria, silica-alumina-zirconia, and also synthetic amorphous silica-aluminas and particularly naturally occurring clays of the attapulgite, montmorillonite and kaolin families, which families include the sub-bentonites and the kaolins commonly known as Dixie, McNamme-Georgia and Florida clays or others in which the main mineral constituent is halloysite, kaolinite, dickite, illite, nacrite or anauxite and activated carbons. Bauxite, attapulgite and fuller's earth are preferred. Such clays can be used in the raw state as originally mined or initially subjected to calcination, acid treatment or chemical modification. Clays in particulate form are generally used herein: preferred are those having a particle size from about 15-60 or 30-60 mesh. The sorbents must have sufficient surface area and porosity to adsorb an effective amount of anhydrous acid gas.

Anhydrous hydrogen chloride is the preferred acid gas, although other anhydrous gases such as sulfur trioxide and hydrogen bromide may be used.

The effective amount of adsorbed anhydrous gas will vary dependent upon type of sorbent and adsorption conditions such as temperature and pressure. Usually the sorbents disclosed herein will contain from about 0.001 to about 10 wt. % of adsorbed acid gas, as for example, HCl and preferably from about 0.1 to about 16.5 wt. % based on the total weight of the sorbent. The actual amount of anhydrous acid gas adsorbed primarily will depend on the particular adsorbent used.

The process of this invention may be a single-step or 3-stage integrated process, continous or batch. The 3-stage process is preferably used when the feed contains 100 ppm or more of water and/or further treatment is to occur after decontamination. In such a process the flowing feed stream is first dried by contact with an appropriate dessicant, passed on to the sorbent and finally contacted by an acid guard such as NaX before the feed is recovered.

For drying purposes, the feedstock is first contacted with a molecular sieve or other suitable drying agent. As mentioned hereinabove, the feedstock may be again contacted with an additional molecular sieve or other sorbent after decontamination to prevent any desorbed acid gas from passing on to additional treatment stages. Molecular sieves used in this manner are untreated conventional zeolitic material. Any suitable dessicant may be used, for example, calcium hydride, soda lime or other commercial drying agents comprised of silica, alumina or mixtures thereof. Suitable crystalline sorbents include synthetic or naturally occurring materials such as faujastie, zeolite X, zeolite Y, mordenite, and various other zeolites as may be suitable, such as ZSM-5 type zeolites, i.e., ZSM-11, ZSM-12, ZSM-35, and ZSM-38. Preferred are X and Y zeolites. Most preferred is NaX.

The hydrocarbon feedstock is usually contacted with the anhydrous sorbent under the following conditions: atmospheric pressure (higher pressure may be used for some particular purpose); a temperature of from about 70°–125° C., preferably 80°–100° C.; and a liquid hourly space velocity (LHSV) of from about 0.1 to 5, preferably 0.4–0.6. The feedstock is exposed to untreated sorbent under the same general conditions, i.e., the contact conditions for pretreatment drying purposes or the post treatment acid guard stage are generally the same as those recited above.

EXAMPLE 1

This example illustrates typical prior art clay percolation treatment methods.

a. 10 volumes of hydrocarbon stock (as described in Table 1) were contacted with 1 volume of bauxite treating clay obtained from the charge of an existing commercial clay treating unit. The treated stock was for identification and testing purposes designated 1a(1–10). An additional 10 volumes of the same hydrocarbon stock were further treated with the same 1 volume of bauxite clay used for the treatment of the initial 10 volumes. It was designated 1a(11–20).

b. Two 10 volume samples of attapulgite treating clay obtained from the charge of an existing commercial unit were similarly treated. The treated samples were designated 1b(1–10) and 1b(11–20).

Treating conditions for both Examples 1a and 1b were 100° C., atmospheric pressure at 0.5 liquid hourly space velocity (LHSV).

EXAMPLE 2

This example illustrates the single step method for treating hydrocarbon feedstocks in accordance with this invention.

a. Bauxite obtained from the charge of an existing commercial bauxite clay treating unit was exposed to anhydrous hydrogen chloride gas until loading was complete, a 4% increase in the weight of the bauxite was recorded. Treatment of two 10 volume samples of the same hydrocarbon stock under the same conditions as described in Example 1a was carried out using the 4% hydrogen chloride loaded bauxite as the treating agent. The samples were designated 2a(1–10) and 2a(11–20).

b. Attapulgite obtained from the charge of a commercial clay treating unit was treated with gaseous anhydrous hydrogen chloride until a 1% increase in the weight of the attapulgite was observed. Two 10 volume samples of hydrocarbon stock were treated as per Example 1a using the 1% hydrogen chloride loaded bauxite as the treating agent. The samples were designated 2b(1–10) and 2b(11–20).

Treating conditions for Examples 2a and 2b were as described above.

EXAMPLE 3

This example illustrates the 3-step process described herein above for treating hydrocarbon feedstocks.

a. Two equal volumes of commercially obtained NaX were calcined at 350° C. in a stream of nitrogen for 3 hours and cooled to room temperature. Two 10 volume samples of hydrocarbon stock were (1) separately dried over the first volume of calcined NaX followed by treatment with bauxite (as described in Example 2) which had been loaded with 4% anhydrous hydrogen chloride followed by treatment with the second volume of calcined NaX. Hydrocarbon stock treated by this three step contacting process was designated 3a(1–10) and 3a(11–20).

b. Two 10 volume samples of the hydrocarbon stock were treated as in 3(a) above with a 1% hydrogen chloride loaded attapulgite clay obtained from an existing commercial unit. The treated stock was designated 3b(1–10) and 3b(11–20).

The treating conditions were the same as in Example 1, i.e., 100° C., atmospheric pressure and 0.5 LHSV.

The oil treated in accordance with the described processes was Arabian Light Stock (properties shown in Table 1 below). Table 2 (below), summarizes the pertinent data obtained on the products treated in accordance therewith. The data therein clearly demonstrates the highly selective decontamination of Arab Light Stock using an anhydrous HCl activated clay. This is a typical illustration of the high degree of efficiency with which this process reduced undesirable nitrogen and other polar content of a liquid hydrocarbon.

Table 1

| Crude Source and Properaties of Stock Used Herein | |
|---|---|
| | 150 S.U.S. Arabian Light Stock |
| Flash Point, PM, ° F | 460 |
| Pour Point, ° F | 0 |
| Gravity, ° API | 30.5 |
| Aniline Point, ° F | 203.7 |
| Sulfur, % Wt. | 0.87 |
| Nitrogen, % Wt. | 0.0032 (32 ppm) |
| Chlorides | negative |

TABLE 2

150 SUS Arabian Light Stock Treated With Hydrogen Chloride sorbed on Clays Obtained From Existing Commercial Units
At 100° C, Atmospheric Pressure and 0.5 LHSV

| Example Number | Volume Oil Processed | S % Wt. | Chloride Ion | Oxidation Stability ASTM D2272, RBOT min. |
|---|---|---|---|---|
| 1a | 1 – 10 | 0.87 | negative | 335 |
|    | 11 – 20 | — | — | 300 |
| 1b | 1 – 10 | 0.87 | negative | 330 |
|    | 11 – 20 | — | — | 270 |
| 2a | 1 – 10 | 0.87 | negative | 360 |
|    | 11 – 20 | — | — | 335 |
| 2b | 1 – 10 | 0.87 | negative | 345 |
|    | 11 – 20 | — | — | 340 |
| 3a | 1 – 10 | 0.87 | negative | 345 |
|    | 11 – 20 | — | — | 335 |
| 3b | 1 – 10 | 0.87 | negative | 350 |
|    | 11 – 20 | — | — | 330 |

A comparison of Example 1 with Examples 2 and 3 clearly illustrates the improvements achieved by the process of this invention. For example, based on the comparative data, a plant in which attapulgite is used will require 1 lb HCl/100 lb make-up attapulgite. In the case of bauxite, however, 4 lbs. of HCl/100 lbs of bauxite will be required. It is estimated that 20 volumes of oil or more, can be processed over 1 volume of HCl-loaded adsorbent before regeneration of the treated adsorbent is required. This is about 1/6 the frequency of regeneration required for the untreated adsorbent.

As will be evident from the above data, variations thereof are within the scope of the art and exemplification of preferred embodiments does not limit the scope of this invention.

We claim:

1. A process for (1) increasing the capacity of a solid sorbent used in a finishing unit for oils of lubricating viscosity and for (2) effecting the removal of undesirable organo-polar compounds from lubricating oils in contact with said sorbent in paid finishing unit comprising (a) continuously removing sorbent from said finishing unit, (b) contacting said sorbent from step (a) with anhydrous acid gas until an effective amount of said gas is adsorbed therein (c) returning the sorbent from step (b) to the finishing unit and (d) contacting said oil and sorbent under suitable removal conditions of temperature and pressure until substantially all of said undesirable compounds are removed from the oil thereby improving the quality of said oil and wherein said solid sorbent is a clay selected from attapulgite, bentonite, kaolin, kaolinite, bauxite, fullers earth, halloysite, montmorillonite, illite and synthetic amorphous silica-aluminas.

2. The process of claim 1 where the oil of lubricating viscosity is selected from the group consisting of crude petroleum oils, and synthetic fractions.

3. The process of claim 1 wherein the anhydrous acid gas is selected from the group consisting of hydrogen bromide, hydrogen chloride, and sulfur trioxide.

4. The process of claim 3 where the anhydrous acid gas is hydrogen chloride.

5. The process of claim 1 where the amount of anhydrous acid gas adsorbed by said sorbent is from about 0.001 wt. % to about 10 wt. %.

6. The process of claim 5 wherein the amount of acid gas adsorbed is from about 0.1 to about 6.5 wt. %.

7. The process of claim 1 wherein the oil is contacted with a suitable dehydrating or drying agent prior to contacting the acid gas treated sorbent in step (d), and thereafter said oil from step (d) is contacted with a crystalline sorbent which has not been sorbed with said acid gas.

8. The process of claim 7 where the dehydrating agent and the crystalline sorbent are zeolite molecular sieves.

9. The process of claim 8 where the dehydrating agent and the crystalline sorbent are NaX zeolite.

10. The process of claim 1 where said sorbent is particulate and has a mesh size of from about 15-60.

* * * * *